UNITED STATES PATENT OFFICE.

HUGH RODMAN, OF PITTSBURGH, PENNSYLVANIA, ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

METHOD OF MANUFACTURING ELECTRODES.

1,013,445. Specification of Letters Patent. Patented Jan. 2, 1912.

No Drawing. Application filed April 8, 1907. Serial No. 367,054.

*To all whom it may concern:*

Be it known that I, HUGH RODMAN, a citizen of the United States, and a resident of Pittsburgh, in the county of Allegheny and State of Pennsylvania, have made a new and useful Invention in Methods of Manufacturing Electrodes, of which the following is a specification.

This invention relates to a method of manufacturing electrodes and has for an object the production of negative plates in which the active mass is impregnated with an inert material for the purpose of resisting shrinkage of the active mass and maintaining the storage capacity of the plates. This and other objects, which will be made apparent in the following specification, are attained by adhering to the method embodied in my invention.

My invention is broad in its scope and, while it may be carried out in a number of different ways and utilized in connection with a number of different materials, I will, for the sake of simplicity and clearness, describe a specific embodiment thereof with no idea of limiting myself to the specific steps of the process described or the material utilized.

A specific embodiment of my invention contemplates the formation of electrodes from barium lead alloy, the forming of the active material of the electrodes by the Planté process and reducing the barium of the alloy to an inert salt, either during or subsequent to the formation of the active material.

The barium alloy is made by subjecting a fused mass of barium salt, which preferably contains some other barium compound, such as the hydroxid, to electrolysis, using a carbon or graphite anode, and a cathode of molten lead. By passing the current as indicated through the fused electrolyte, metallic barium is deposited upon the surface of the molten lead and is mixed therewith by any suitable means of stirring. The barium lead alloy is then molded or pressed into shapes suitable for use as storage battery plates or parts thereof. The plates or parts, which are similar in appearances to plates or parts made from pure lead or the ordinary lead alloys, are then subjected to any of the well known processes of Planté formation. They are, for example, made the anode in an electrolyte comprising a suitable mixture of sulfuric and nitric acid. The electrolytic action changes the surfaces of the lead alloy into lead peroxid, which, in the case of the barium alloy, as distinguished from the other alloys or pure lead, has intimately diffused throughout its mass finely divided barium sulfate, the sulfate being formed by the reaction between the metallic barium of the alloy and the sulfuric acid of the electrolyte.

After the peroxid has been reduced to sponge lead, the plates constitute negative pole plates with the active mass impregnated with finely divided barium sulfate. The impregnation of the active mass with the inert barium sulfate prevents the shrinkage and closing up of the pores of the mass, and, therefore, maintains the storage capacity of the electrode so formed.

Other metals besides barium may be utilized in forming the lead alloy and other means may be employed for converting the metals into inert salts, for the purpose of impregnating the active mass of the electrodes; for example, a number of the metals of the barium group may be utilized in forming the lead alloy and they may be subsequently reduced to inert salts in precisely the same way as the barium is reduced, or by methods better suited to the metals utilized. The alloy may be cast in molds or pressed in the form of grids or pellets, which may be subsequently applied to storage battery use, or as implied by the description, the alloy may be cast in the shape of an electrode and the active mass may be formed from the metal of the electrodes.

In accordance with the provisions of the patent statutes, I have described a method of carrying out my invention which I now consider to represent the best embodiment thereof, but I desire to have it understood that other methods may be employed and still fall within the spirit and scope of my invention.

What I claim and desire to secure by Letters Patent is:

1. The method of manufacturing storage battery electrodes, which consists in forming an electrode of a barium lead alloy, converting a portion of the lead of the electrode into active material and a portion of the barium into an insoluble substance incorporated within the active material.

2. The method of manufacturing storage battery electrodes, which consists in forming an electrode of an alloy of lead and a second metal, converting a portion of the lead into active material and a portion of the second material to an inert substance incorporated within the material.

3. The method of forming Planté pole plates containing inert insoluble material which consists in making a barium lead alloy, pressing or molding the alloy into suitable shapes, converting a portion of the lead into active material and reducing a portion of the barium to an inert salt.

4. The method of manufacturing storage battery electrodes containing inert material which consists of forming an electrode of a metallic alloy, converting a portion of one of the metals of said alloy into active material, and a portion of another metal of the alloy into an inert salt.

5. The method of manufacturing storage battery electrodes containing insoluble inert material, which consists in forming an electrode of a metallic alloy, converting a portion of one metal of the alloy into active material, and a portion of another metal of the alloy into an inert substance.

6. As an article of manufacture, a storage battery electrode, comprising a plate, a portion of which is formed of barium lead alloy and a portion of sponge lead impregnated with an insoluble barium salt.

7. An article of manufacture, comprising a storage battery electrode, a portion of which is formed of a lead alloy and a portion of which consists of sponge lead impregnated with a salt formed from the other metal of the alloy.

8. As an article of manufacture, a storage battery electrode, comprising a plate, a portion of which is formed of a metallic alloy, a portion of metallic sponge formed from one of the metals of said alloy and permeated with an insoluble salt of another metal of said alloy.

9. As an article of manufacture, a storage battery electrode, a portion of which comprises a metallic alloy, carrying active material formed from one of the metals of the alloy and permeated with an insoluble salt formed from another metal of said alloy.

10. The method of making active material or material to become active for use in storage battery electrodes which consists in forming the same of an alloy of lead and a second material and then converting a portion of the lead into active material and the second material into inert substance.

11. A storage battery electrode consisting in part of a lead alloy, the lead constituent of which has been converted into active material and the alloy constituent of which has been converted into an insoluble inert compound disseminated throughout the entire mass.

12. The method of making active material for use in storage battery electrodes which consists in converting a lead alloy into a mass comprising an active lead compound and an intermingled insoluble inert compound, the latter being formed from the alloying material.

In testimony whereof, I have hereunto subscribed my name this 6th day of April, 1907.

HUGH RODMAN.

Witnesses:
 CHARLES W. McGHEE,
 E. W. McCALLISTER.